United States Patent Office 3,201,385
Patented Aug. 17, 1965

3,201,385
SYNTHESIS OF ARBUTIN
Arthur D. Jarrett, Watertown, Mass., assignor to Polaroid Corporation, Cambridge, Mass., a corporation of Delaware
No Drawing. Filed Feb. 11, 1963, Ser. No. 257,767
2 Claims. (Cl. 260—210)

This invention relates to a novel synthesis of a chemical compound.

One object of this invention is to provide a novel synthesis for arbutin.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

The compound arbutin

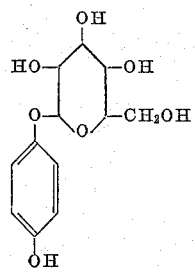

Hydroquinone-β-D-glucopyranoside is generally derived from natural sources. It has now been found that arbutin can be synthesized chemically. The article "Methyl and Phenyl Glycosides of the Common Sugars" by J. Conchie, G. A. Levvy and C. A. Marsh, Advances in Carbohydrate Chemistry, vol. 12, page 157, describes a procedure for condensing phenols with acetylated sugars, e.g., β-d-glucose pentaacetate

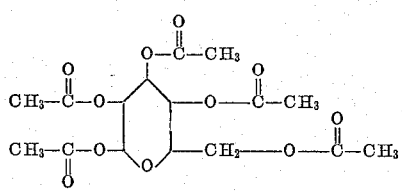

to produce phenolic glucosides. The above-mentioned article suggests reacting β-d-glucose pentaacetate with a hydroquinone to produce arbutin. However, reacting hydroquinone per se with β-d-glucose pentaacetate with aluminum chloride as a catalyst results in an impure product as a result of side reactions through the second hydroxyl radical with an overall yield of arbutin of only about 50%. Protecting the hydroxyl group with a benzoyl radical, e.g., using hydroquinone monobenzoate,

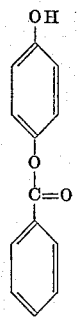

and reacting with β-d-glucose pentaacetate and borontrifluoride only produces, after removal of the acetoxy groups and the benzoyl group, arbutin in about 50% yield.

It has now been found, however, that by reacting β-d-glucose pentaacetate with hydroquinone which has a hydroxyl group protected with a benzyl group, e.g., hydroquinone monobenzylether and phosphorus oxychloride, removing the acetoxy groups and the benzyl group, a significantly higher yield of pure arbutin is obtained than with other methods. Overall yields on the order of 70% are achieved utilizing the above-described method.

The following example illustrates the synthesis of arbutin within the scope of this invention.

Example

To a 500 cc. three-necked flask fitted with a mechanical stirrer, stopper, and reflux condenser with a drying tube was added a solution of 25 gm. (0.064 m.) of β-d-glucose pentaacetate, 38.4 gm. (0.192 m.) of hydroquinone monobenzylether, 1.5 cc. (2.5 gm., 0.016 m.) of phosphorus oxychloride (containing 1% by volume of water), and 200 cc. of dry benzene. The solution was refluxed for three hours, then cooled and washed twice with 100 cc. portions of 2 N sodium hydroxide and twice with 100 cc. portions of water. The thus-washed solution was dried over anhydrous calcium chloride and filtered. The solvent was then removed by evaporation and benzylarbutin tetraacetate solidified in the flask. A 98% yield of crude benzylarbutin tetraacetate is obtained which, on trituration with hexane and recrystallization from ethanol, yields pure benzylarbutin tetraacetate melting at 109–110° C. in 71% yield. Benzylarbutin tetraacetate, 12.7 gm. (0.005 m.), was dissolved in 40 cc. of dry methanol. A small chip of sodium metal was added and the solution was heated to remove the solvent. A white solid, benzylarbutin, melting at 157–159° C., was obtained by recrystallizing from water. Benzylarbutin, 0.5 gm., was placed in a hydrogenation bottle with 50 cc. of ethanol with approximately 100 mg. of 10% palladium over charcoal. The compound was reduced at room temperature in less than an hour. Arbutin was isolated by filtration through Celite and evaporation of the solvent. Arbutin, melting at 193–4° C., was recovered in overall yield from β-d-glucose pentaacetate of 70%.

The compound prepared by the novel process of this invention is useful in stabilizing color photographic images, as disclosed in the copending application of Samuel Dershowitz, Serial No. 247,868, filed December 28, 1962.

Since certain changes may be made in the above process without departing from the scope of the invention herein involved, it is intended that all matter contained in the above description shall be interpreted as illustrative and not in a limiting sense.

What is claimed is:

1. The process of preparing arbutin comprising (a) refluxing hydroquinone monobenzylether and β-d-glucose pentaacetate with phosphorus oxychloride to form benzylarbutin tetraacetate, (b) reacting said benzylarbutin tetraacetate with sodium and methanol to form benzylarbutin, and (c) hydrogenating said benzylarbutin to arbutin.

2. The process of claim 1 wherein said hydrogenation is effected in the presence of a palladium-over-charcoal catalyst.

References Cited by the Examiner

UNITED STATES PATENTS 3,073,788  1/63  Hostettler et al. _____ 260—210

FOREIGN PATENTS 1,013,503  4/52  France.

OTHER REFERENCES

Conchie et al.: "Advance in Carbohydrate Chemistry," vol. 12, 1957, pages 157–169, Academic Press Inc., publishers, New York, N.Y.

LEWIS GOTTS, *Primary Examiner.*